Patented Nov. 8, 1932

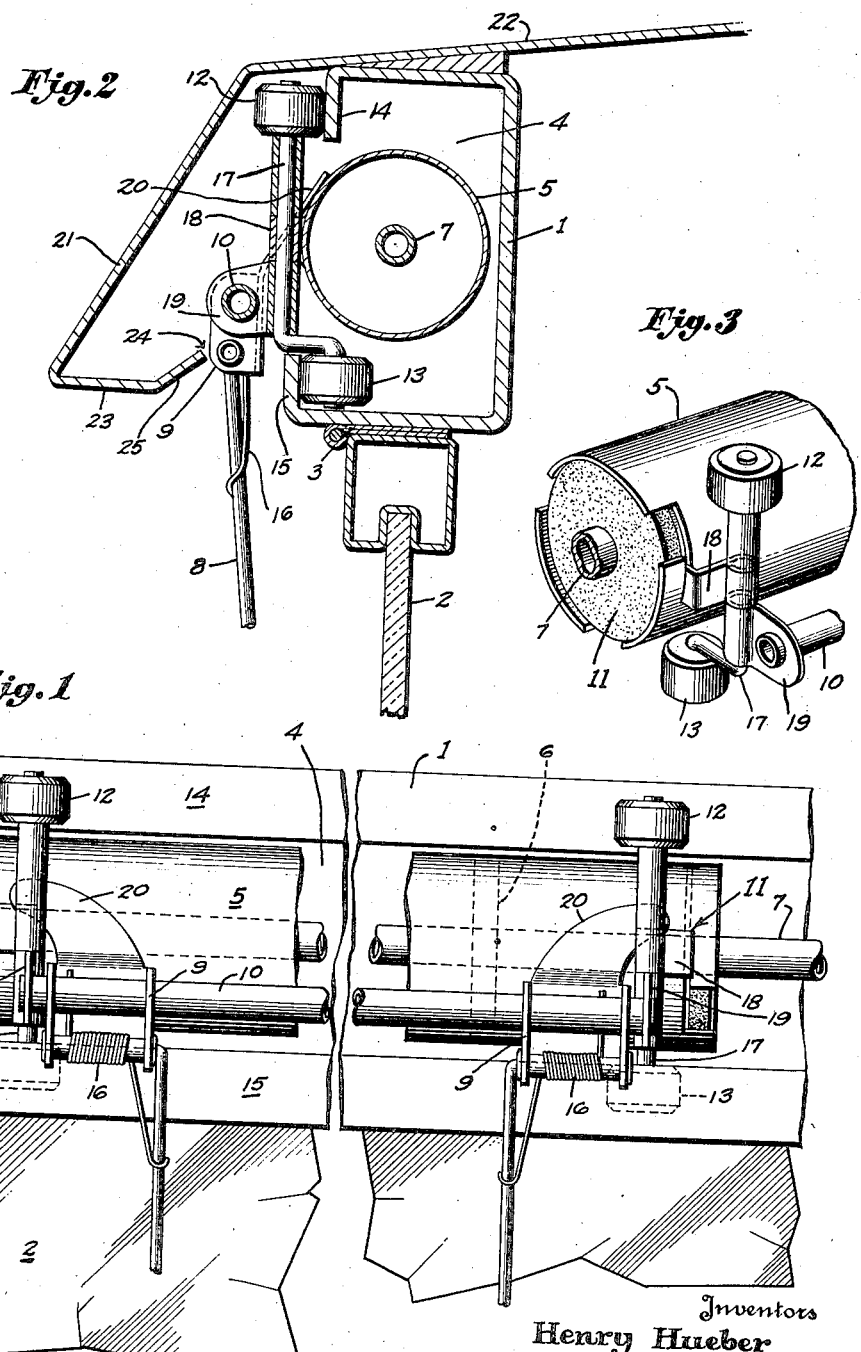

1,886,812

UNITED STATES PATENT OFFICE

HENRY HUEBER, OF BUFFALO, AND ERWIN C. HORTON, OF HAMBURG, NEW YORK, ASSIGNORS TO TRICO PRODUCTS CORPORATION, OF BUFFALO, NEW YORK

COMBINED WINDSHIELD AND CLEANER STRUCTURE

Application filed October 24, 1930. Serial No. 491,014.

This invention relates to a combined windshield and cleaner structure wherein the cleaner is incorporated in the fabrication of the windshield.

Ordinarily the windshield cleaner, which embodies some type of power drive such as a fluid pressure operated motor, has the motor element arranged at the interior of the car with the actuating shaft projected through the windshield to the forward side thereof, or disposed entirely on the exterior side thereof. These usual mountings necessitate an exposed motor which projects from the header bar of the windshield and therefore requires ample room for its mounting as well as protection from inclement weather.

In arriving at a better and more durable construction of the frame of an automobile, the header bar has been designed of metal to give substantial form thereto. In accordance with the present invention this header bar is constructed to house and cooperate in the action of the windshield cleaner mechanism as a part thereof. The object, therefore, of the present invention is to provide a combination header bar and windshield cleaner construction and assembly which will enable the head room at the front and rear sides of the windshield to be reduced, and the several associated parts of the combined structure to be compacted for presenting a neat appearance to the front of the vehicle.

The invention further resides in the combination of a header bar with a windshield cleaner mechanism in which the bar constitutes a housing for the cleaner and serves to cooperate therewith in guiding and defining the wiper path, and further to simplify the construction and render the action of the cleaner more efficient.

In the drawing:—

Fig. 1 is a fragmentary front view of the combined windshield and cleaner, with the visor or forward portion of the housing removed;

Fig. 2 is a cross sectional view through the forward upper portion of the windshield and cleaner; and Fig. 3 is a fragmentary perspective view of one end of the windshield cleaner.

Referring more in detail to the accompanying drawing, the numeral 1 designates the header bar and 2 the transparency which may be adjustably related to the header bar as by the hinge 3 whereby the windshield glass may be swung forwardly for purposes of ventilation. The header bar is provided with a motor chamber 4 in which is housed the windshield cleaner motor, herein illustrated as being of the fluid pressure type disclosed in the patent to Henry Hueber No. 1,697,358 granted January 1, 1929.

This motor broadly comprises a cylinder 5 operating over a fixed piston 6 which has inlet and outlet pipes 7 extended through the ends of the cylinder for support in the ends of the header bar 1. Valve mechanism (not shown) in the piston functions to effect such operative application of pressure as will reciprocate the cylinder on the pipes 7 to actuate the wipers across the glass. The wiper carrying arms 8 are pivoted on frames 9 for permitting swinging adjustment of the windshield, and said frames are mounted on the supporting rod 10 which in turn is carried by the opposite ends 11 of the cylinder 5;—all as is clearly set forth in the above noted patent.

For strength and durability the chambered header bar is of channeled formation with the channel thereof opening forwardly so as to provide an open front through which the cleaner motor has connection with the wiper carrying arms 8. The wiper supporting rod 10 is held against turning with the cylinder 5 about the pipes 7 and for this reason there is provided adjacent each end of the rod 10 one or more rollers for tracking on the header bar 1. In the present showing there is provided an upper roller 12 and lower roller 13 and cooperating with these rollers are the rails 14 and 15. These rails may be in the form of flanges, turned respectively down and up from the upper and lower walls of the channeled header bar 1 into the open front thereof. The upper roller 12 is designed to track on the outer face of the rail 14 while the lower roller 13 is arranged to track along the inner face of the rail 15 so as to withstand the tendency of the springs 16, which urge the wiper arms 8 and their supported wipers against the glass, from turning the cylinder 5 about the pipe 7 in a clockwise direction with respect to Fig. 2. These rollers are mounted upon vertical shafts 17 which are supported in bracket arms 18 carried by the cylinder. The shaft 17 may also support the ears 19 by which the wiper supporting rod 10 is connected to the cylinder ends 11. The rail 15 may be more or less in the plane of the upper rail 14 and the lower ends of the shafts 17 offset inwardly accordingly, thereby decreasing the depth of the header bar. The frames 9 are held against turning under the action of the springs 16 by lugs 20 engaged with the cylinder assembly. The rollers, together with the rod 10, the frames 9 and their related parts, constitute a carriage assembly for tracking on the frame bar 1.

A more complete enclosure for the cleaner mechanism is provided by a visor-like wall or extension 21 which is extended downwardly from the roof 22 of the car and has its lower forward edge turned under, as at 23, to form with the header bar a composite housing having a slot or guideway 24 in its underside through which the wiper carrying arms 8 are extended and operated.

During the operation of the cleaner 5 the cylinder is reciprocated back and forth on the fluid pipes 7 causing the rollers 12 and 13 to track respectively upon the upper and lower rails 14 and 15. The tracking of the rollers upon their rails imparts a longitudinal movement to the wiper carrying arms 8 back and forth across the windshield glass.

The windshield 2 is readily adjustable and may be swung forwardly on its hinge 3 without hindrance by the wiper carrying arms which are mounted for a slight swinging action, the inner edge 25 of the bottom wall 23 of the visor being angularly disposed, where necessary, to permit such wiper arm movement. By embodying the windshield cleaner in the windshield frame construction the several parts are compacted together for greater durability and efficiency in operation, more economy in space and additional protection for the windshield cleaner.

What is claimed is:

1. In combination with a windshield having a horizontal frame bar chambered for the reception of a cleaner motor, of a windshield cleaner comprising a motor arranged within the chamber of the frame bar to be housed thereby, said frame bar having an open side adjacent the front face of the windshield glass, wiper means, and means operatively connecting the wiper means to the motor through the open side of the frame bar whereby the wiper means are reciprocated over the front face of the windshield glass.

2. In combination with a windshield having a horizontal frame bar chambered for the reception of a cleaner motor, of a windshield cleaner comprising a motor arranged within the chamber of the frame bar to be housed thereby, said frame bar having an open side adjacent the front face of the windshield glass, a wiper carrying arm for supporting a wiper blade, said arm connected to the motor through the open side of the frame bar, and a visor overhanging the open side of the windshield frame bar to close the same to the weather and forming with the bar a slot through which the arm operates.

3. A windshield having a header bar of channeled iron with the chamber thereof opening forwardly over the windshield transparency, a windshield cleaner motor having a reciprocatory member disposed within the chamber of the header bar to be housed thereby and for movement lengthwise thereof, a carriage operable by said reciprocatory member and guided by the header bar, said carriage operating over the open front side of the header bar, and wiper means carried by the carriage to be reciprocated thereby.

4. A windshield having a header bar of channeled iron with the chamber thereof opening forwardly over the windshield transparency, a windshield cleaner motor having a reciprocatory member disposed within the chamber of the header bar to be housed thereby and for movement lengthwise thereof, a carriage operable by said reciprocatory member, said header bar having a pair of rails and said carriage having parts tracking said rails, and a wiper carrying arm depending from the carriage and operable thereby.

5. A windshield having an overhanging visor and a chambered header bar opening at its front side beneath the visor whereby the latter will close the open front of the bar to the weather, a windshield cleaner motor housed within the chamber of the header bar and having a carriage movable by the motor along the open side thereof and projecting beneath the visor, said header bar having upper and lower rails and said carriage having parts coacting with the rails to guide the carriage, and wiper means operable by the carriage over the front face of the windshield glass.

6. A windshield having an overhanging visor and a chambered header bar opening at its front side beneath the visor to be closed thereby to the weather, a windshield cleaner motor housed within the chamber of the header bar and having a carriage movable over the open front thereof and beneath the visor, said header bar having upper and lower rails and said carriage having parts coacting with the rails to guide the carriage, said visor having its forward edge turned under and extended rearwardly short of the header bar to form with the latter a slot, and a wiper carrying arm on the carriage depending therefrom through the slot.

7. A windshield having a chambered header bar opening forwardly, a piston within the chamber of the bar, pipes extending lengthwise of the bar from the piston for supporting the latter within the chamber, a cylinder inclosing the piston and reciprocal on said pipes, said header bar housing said cylinder, bracket arms extending from the opposite end portions of the cylinder, upright shafts supported by the arms, rollers mounted on the shafts and tracking on the header bar, a support carried between the bracket arms, a wiper arm on said support and depending therefrom, and a wiper carried by the arm.

8. In combination with a windshield frame having a header bar provided with a chamber, and a windshield glass in the frame; wiper operating means reciprocable on the glass, and means housed within the chamber for actuating the wiper operating means.

HENRY HUEBER.
ERWIN C. HORTON.